(12) United States Patent
Ford et al.

(10) Patent No.: US 6,728,637 B2
(45) Date of Patent: *Apr. 27, 2004

(54) TRACK MODEL CONSTRAINT FOR GPS POSITION

(75) Inventors: Thomas J. Ford, Calgary (CA);
Patrick C. Fenton, Calgary (CA);
James O. McGuffin, Saratoga, CA (US); Stanley K. Honey, Palo Alto, CA (US)

(73) Assignee: Sportvision, Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/888,195

(22) Filed: Jun. 22, 2001

(65) Prior Publication Data

US 2002/0107636 A1 Aug. 8, 2002

Related U.S. Application Data

(60) Provisional application No. 60/295,310, filed on Jun. 1, 2001, and provisional application No. 60/213,684, filed on Jun. 23, 2000.

(51) Int. Cl.[7] .......................... G06C 21/26; H04B 7/185
(52) U.S. Cl. ................................ 701/213; 342/357.06
(58) Field of Search ................................ 701/200, 207, 701/213–215; 342/357.02–357.09, 358, 451–453, 457

(56) References Cited

U.S. PATENT DOCUMENTS

| 5,101,416 | A |   | 3/1992  | Fenton et al.              |
|-----------|---|---|---------|----------------------------|
| 5,129,605 | A |   | 7/1992  | Burns et al.               |
| 5,631,658 | A | * | 5/1997  | Gudat et al. ....... 342/457 |
| 5,736,961 | A |   | 4/1998  | Fenton et al.              |
| 5,828,979 | A |   | 10/1998 | Polivka et al.             |
| 5,977,909 | A |   | 11/1999 | Harrison et al.            |
| 5,986,604 | A |   | 11/1999 | Nichols et al.             |
| 6,061,018 | A |   | 5/2000  | Sheynblat                  |
| 6,184,822 | B1|   | 2/2001  | Fenton et al.              |
| 6,191,732 | B1| * | 2/2001  | Carlson et al. ....... 342/357.06 |
| 6,211,821 | B1|   | 4/2001  | Ford                       |
| 6,314,363 | B1| * | 11/2001 | Pilley et al. ............ 701/120 |

OTHER PUBLICATIONS

G. Dissanayake, et al., The Aiding of a Low–Cost Stapdown Inertial Measurement Unit Using Vehicle Model Constraints for Land Vehicle Applications, IEEE Transactions on Robotics and Automation, vol. 17, No. 5, Oct. 2001, pp. 731–747.

Y. J. Cui, et al., Autonomous Vehicle Positioning with GPS in Urban Canyon Environments, Proceedings of the 2001 IEEE International Conference on Robotics & Automation, May 2001, pp. 1105–1110.

P.Y.C. Hwang, Kinematic PGS: Resolving Integer Ambiguities on the Fly, IEEE Plans '90, Position Location and Navigation Symposium, 1990, pp. 579–586.

(List continued on next page.)

*Primary Examiner*—Thu V. Nguyen
(74) *Attorney, Agent, or Firm*—Vierra Magen Marcus Harmon & DeNiro LLP

(57) ABSTRACT

A track model is created for use with a GPS receiver. In one embodiment, the track model is a set of planar surfaces which approximate the contiguous surface on which navigation takes place. The GPS receiver searches for an appropriate planar surface associated with its approximate position. Having found the appropriate planar surface, the GPS receiver constrains its position using the planar surface associated with its approximate position. Using the track model improves the accuracy of the computed position at the time and improves the ambiguity estimation process so that positions with greatly improved accuracy are available sooner.

42 Claims, 4 Drawing Sheets

OTHER PUBLICATIONS

A. Hassan, et al., Optimized Processing of Satellite Signal Via Evolutionary Search Algorithm, TENCON 2000, Proceedings, vol. 1, 2000, pp. 115–121.

M. Phatak, et al., Position Fix From Three GPS Satellites and Altitude: A Direct Method, IEEE Transactions on Aerospace and Electronic Systems, vol. 35, 1999, pp. 350–354.

T.J. Ford and J. Neumann, A Real Time Floating Ambiguity Positioning System, Proceedings of ION GPS 1994, Salt Lake City, Utah, Sep. 20, 1994.

* cited by examiner

TRACK MODEL CONSTRAINT FOR GPS POSITION

This application claims the benefit of U.S. Provisional Application No. 60/213,684, "Locating an Object Using GPS With Additional Data," filed on Jun. 23, 2000; and U.S. Provisional Application No. 60/295,310, "Track Model Constraint Enhancement For GPS Receiver," filed on Jun. 1, 2001; both of which are incorporated herein by reference.

BACKGROUND OF THE INVENTION

1. Field of the Invention

The present invention is directed to the use of a track model to constrain a GPS position.

2. Description of the Related Art

Technologies for tracking moving objects are in demand. For example, systems are used to track airplanes, automobiles, persons, objects at sporting events and other objects of interest. One technology that has become popular for tracking objects is the use of the Global Positioning System (GPS). GPS is a satellite based navigation system operated and maintained by the U.S. Department of Defense. GPS consists of a constellation of GPS satellites providing worldwide, 24 hour, three dimensional navigational services. By computing the distance to GPS satellites orbiting the earth, a GPS receiver can calculate an accurate position of itself. This process is called satellite ranging. The position being tracked is the position of the antenna of the GPS receiver.

Each GPS satellite carries an atomic clock to provide timing information for the signals transmitted by the satellites. Internal clock correction is provided for each satellite clock. Each GPS satellites transmits two spread spectrum, L-band carrier signals-an $L_1$ signal with carrier frequency $f_1$=1575.42 MHz and an $L_2$ signal with carrier frequency $f_2$=1227.6 MHz. These two frequencies are integral multiples $f_1$=1540$f_0$ and $f_2$=1200$f_0$ of a base frequency $f_0$=1.023 MHz. The L1 signal from each satellite uses binary phase shift keying (BPSK), modulated by two pseudorandom noise (PRN) codes in phase quadrature, designated as a C/A code and P code. The L2 signal from each satellite is BPSK modulated by only the P code.

A GPS receiver measures distance using the travel time of radio signals. To measure travel time of a GPS signal from the satellite to a receiver, the receiver will generate the same pseudo-random code as the satellite and compare the generated code with the received code to determine the shift between the two codes. The travel time is multiplied by the speed of light to determine the distance between the satellite and the receiver. Along with distance, a GPS receiver needs to know exactly where the satellites are in space. A calculation of a three dimensional location generally requires valid data from four satellites. GPS receivers can also provide precise time information.

The above described method of computing position requires very accurate synchronization of the satellite and receiver clocks used for the time measurements. GPS satellites use very accurate and stable atomic clocks, but it is economically infeasible to provide a comparable clock in a receiver. The problem of clock synchronization is circumvented in GPS by treating the receiver clock error as an additional unknown in the navigation equations and using measurements from an additional satellite to provide enough equations for a solution for time as well as for position. Thus, the receiver can use a less expensive clock for measuring time. Such an approach leads to the pseudorange measurement:

$$\rho = c(t_{rcve} - t_{xmit})$$

where $t_{rcve}$ is the time at which a specific, identifiable portion of the signal is received, $t_{xmit}$ is the time at which that same portion of the signal is transmitted, and c is the speed of light. Note that $t_{rcve}$ is measured according to the receiver clock, which may have a large time error. The variable $t_{xmit}$ is in terms of GPS satellite time.

If pseudorange measurements can be made from at least four satellites, enough information exists to solve for the unknown receiver position (X, Y, Z) of the receiver antenna and for the receiver clock error $C_b$. The equations are set up by equating the measured pseudorange to each satellite with the corresponding unknown user-to-satellite distance plus the receiver clock error:

$$\rho_1 = \sqrt{(x_1 - X)^2 + (y_1 + Y)^2 + (z_1 + Z)^2} + c_b$$

$$\rho_2 = \sqrt{(x_2 - X)^2 + (y_2 + Y)^2 + (z_2 + Z)^2} + c_b$$

$$\rho_3 = \sqrt{(x_3 - X)^2 + (y_3 + Y)^2 + (z_3 + Z)^2} + c_b$$

$$\rho_4 = \sqrt{(x_4 - X)^2 + (y_4 + Y)^2 + (z_4 + Z)^2} + c_b$$

where $\rho_i$ denotes the measured pseudorange of the ith satellite whose position in ECEF coordinates at $t_{xmit}$ is ($x_1$, $y_1$, $z_1$). There are four equations depicted above. The unknowns in this nonlinear system of equations are the receiver position (X,Y,Z) in ECEF coordinates and the receiver clock error $C_b$. If more than four satellites are used, there will be an equation for each satellite.

There are a number of errors that are associated with GPS ranging, including errors due to the Earth's ionosphere and atmosphere, noise, multipath satellite clock, and ephemeris errors. Additionally, basic geometry itself can based on the configuration of the satellites in the sky can magnify the errors. The dilution of precision, a measure of error, is a description of the uncertainty of particular GPS data.

One enhancement to standard GPS technology includes the techniques of differential GPS, which involves a reference GPS receiver that is stationary and has its position accurately surveyed. To understand differential GPS, it is important to know that satellite signals have errors which have a high spatial and temporal correlation. So, if two receivers are fairly close to each other, the signals that reach both of them will have traveled through virtually the same slice of atmosphere, and will have virtually the same errors. With differential GPS, the stationary reference receiver is used to measure errors. The reference receiver then provides error correction information to the other receivers (e.g. roving receivers). This way, systemic errors can be reduced. The reference receiver receives the same GPS signals as the roving receivers. Instead of using timing signals to calculate its position, the reference receiver uses its known position to calculate timing. It figures out what the travel time of the GPS signals should be, and compares it to what they actually are. The difference is used to identify the error information (also called differential corrections or differential GPS data). The reference receiver then transmits the differential corrections to the roving receivers in order to correct the measurement of the roving receivers. Since the reference receiver has no way of knowing which of the many available satellites a roving receiver might be using to calculate is position, the reference receiver quickly runs through all the visible satellites and computes each of their errors. The roving receivers apply the differential corrections to the particular satellite data they are using based on information from the reference receiver. The differential correction from the reference receiver improves the pseudorange position accuracy because its application can eliminate to varying degrees many of the spatially and temporally correllated errors in the pseudorange measured at the rover receiver. A differential GPS reference receiver can also transmit its carrier measurements and pseudoranges to the roving receiver. The set of measurements and pseduoranges transmitted from the reference receiver can be used to improve the position accuracy through the use of differential carrier positioning methods.

Despite the use of differential GPS, many land applications which use GPS are hampered by the restrictions imposed by buildings and natural impediments to the transmitted GPS signals. Often the GPS geometry is too poor to provide the geometrical strength required to generate the position accuracy that an application requires. One particular example of an environment for which the above described GPS technology does not provide sufficient accuracy and reliability is the real-time tracking of automobiles (or other objects) during a race, which requires extreme positioning accuracy and reliability in conditions of reduced satellite visibility and a highly dynamic environment. In an environment such as a professional auto race, the visibility of all satellites is severely reduced at some point on the track due to the existence of obstacles such as a grandstand. Additionally, the availability of satellites is reduced and the remaining signals are corrupted by the proximity of objects such as a 10 meter tall overhanging steel and wire fence on the outside edge of the track. Typically, the tracks are not level and the cross track slope is not constant (varying by as much as 35 degrees between the straight sections and the curves), all of which further degrade GPS accuracy and reliability. There are many environments in addition to race tracks which have the same problems.

Clock and height constraints can be used to supplement the geometry provided by the satellite constellation and in some cases provide a degraded solution in cases when less than four satellites are available. If a height constraint is used to aid the position estimation, the method used is to assume the constraint is with respect to a planar surface which is parallel to the local level plane at the approximate position of the receiver. The uncertainty of the constraining position can be represented in the local level frame by a diagonal covariance matrix with large entries for the horizontal components and a relatively small entry for the vertical component. Since the estimation is done in the Earth Centered Earth Fixed (ECEF) frame, the covariance in the local level frame has to be transformed to the ECEF frame with the linear transformation relating the two frames. In many land and air applications, such constraints are not particularly useful for navigation because the constraints are often not accurate enough to significantly strengthen the navigation solution.

Therefore, an improvement to current GPS technology is needed in order to accurately track objects in environments (e.g. race track and others) with the conditions similar to that described above.

SUMMARY OF THE INVENTION

The present invention, roughly described, pertains to the use of a track model to constrain a GPS derived position in order to improve accuracy and reliability. In one embodiment, the track model includes a set of planar surfaces which approximate the contiguous (or non-contiguous) surface (or surfaces) on which navigation takes place (or near where navigation takes place). The GPS receiver searches for an appropriate planar surface associated with its approximate position. Having found the appropriate planar section, the GPS receiver constrains its position using the planar surface associated with its approximate position. Using the track model improves the accuracy of the computed position at the time and improves the ambiguity estimation process so that positions with greatly improved accuracy are available sooner.

One embodiment of the present invention includes accessing a model of one or more surfaces that an object travels in relation to and using that model to constrain a GPS based determination of a position of the object. In one implementation, the GPS receiver searches for an appropriate planar section by projecting its approximate position onto a horizontal reference frame used by the model. Having found the appropriate planar section, the remote receiver constrains its position in the direction normal to the planar section. In one alternative, the model is created based on a geographic frame, the GPS based position determination is performed in an ECEF frame, the process of identifying the appropriate planar section is performed in an intermediate frame, the planar sections are triangles (or other polygons), the system can use the model to perform a single epoch pseudorange differential process that is constrained by one of the triangles (pseudorange diff.), and/or the system can use the model to constrain a position determined with a Kalman filter (carrier diff.).

In one embodiment, the track model constraining process is similar in some ways to the height constraint process. However, in the track model constraint process the constraint position and covariance (or weight) matrix change at almost every positioning epoch, and the constraining planes are not necessarily parallel to the local level plane.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, flash memory, RAM, ROM or other suitable storage devices. In alternative embodiments, some or all of the software can be replaced by dedicated hardware including custom integrated circuits, gate arrays, FPGAs, PLDs, and special purpose computers. In some embodiments, one or more processing units, a storage device, an antenna and associated logic are used to implement the present invention. The hardware can be used with or without software.

These and other objects and advantages of the present invention will appear more clearly from the following description in which the preferred embodiment of the invention has been set forth in conjunction with the drawings.

DETAILED DESCRIPTION

Figure 1:
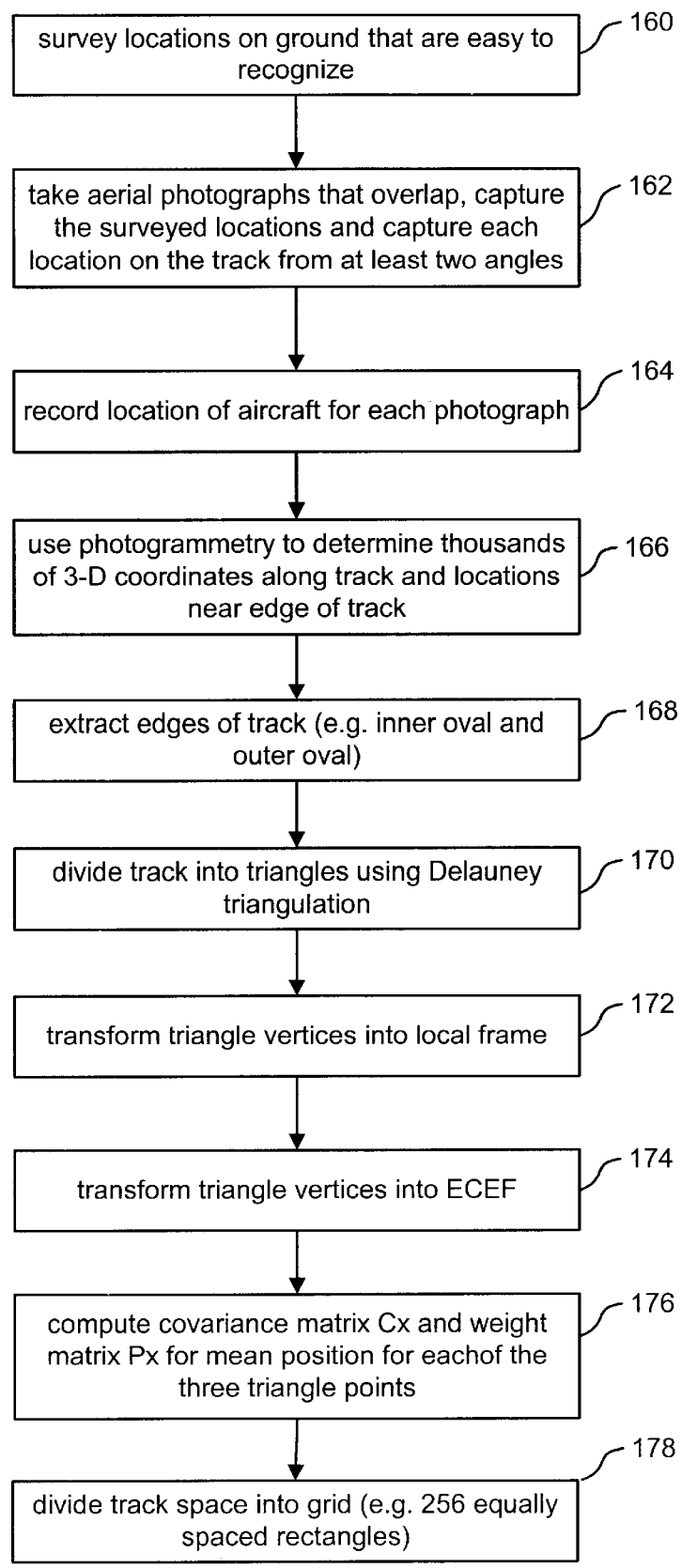
FIG. 1 is a flow chart describing a process for creating a track model.

The present invention pertains to using a track model to constrain a GPS derived position. In one embodiment, a track model is a set of two or more planar surfaces which approximate the (contiguous or non-contiguous) surface (or surfaces) on which the navigation takes place (or near where navigation takes place). A track model can model may different types of surfaces, and is not confined to only model a race track. In one embodiment, each planar surface is defined by three vertex points and, thus, is a triangle. Other shapes can also be used. In one implementation, the constraint provided by the track model is that while the antenna is "within" the triangle, the position of the antenna is constant in the direction normal to the planar section. Based on a fixed antenna height, a planar constraint can be defined with respect to the local planar section.

The track model positions are defined in WGS84 geographic co-ordinates but the internal reference frame for the GPS filter is in ECEF co-ordinates. This would not be a problem (the geographic co-ordinates can be simply transformed to ECEF vectors), except that the triangle search engine (described below) requires a primarily two dimensional frame. This could be satisfied if the internal position was transformed to geographic co-ordinates, but this transformation is time consuming, and it is possible that it may have to be carried out more than once per solution. So, the system generates a local (or intermediate) frame representing the model and a simple transformation that converts vectors in the ECEF frame to vectors in the local frame. The corner positions of all the triangles (in the ECEF frame) are differenced with a local "base position." These are rotated to the local frame by the rotation matrix required to rotate a vector in the ECEF frame at the base position to a vector at the base position but in the geographic frame. Local coordinates are generated in this manner for all the points in the track model. The generation is as follows:

Coordinates of model point in the local frame:

$$P_l = R_e^{1*}(P_{ECEF} - P_{BaseECEF})$$

where $P_{BaseECEF}$ is the base position vector in the ECEF frame, $P_{ECEF}$ is the track model position in the ECEF frame, and $R_e^1$ is the rotation matrix used to transform a vector in the ECEF frame to the geographic frame at the base position.

If a triangle search is required (see below), the current GPS position is transformed to the local frame via the same method and the search progresses as usual in that frame. Internally in the GPS receiver, the coordinates for all the points in the track model are maintained both in the ECEF frame and in the local frame. The constraint position is generated from the ECEF coordinates, and the search algorithm is applied using the coordinates in the local frame. The search algorithm described later finds an appropriate triangle. The previously generated constraint position is taken from it and used as a seed position in the least squares pseduorange filter and as a position update in the Kalman filter used to generate refined carrier based positons. In the pseudo range case, the 6 weight matrix elements for that triangle constraint are expanded to generate a weight matrix $P_x$ for the least squares filter. Alternatively, in the combined pseudo range/carrier observation case, the 6 elements representing the upper triangular portion of the covariance matrix for that triangle constraint are expanded to generate a covariance matrix$_{Cx}$ for the Kalman filter.

FIG. 1 is a flow chart describing the process for creating a track model. In step 160, various locations on the ground at or near the race track (or other surface) that are easy to recognize are accurately surveyed. In step 162, aerial photographs are taken of the race track (or other surface). The photographs are taken from an aircraft approximately 300 meters above the track surface and are overlapping so that they capture each location on the race track and each of the surveyed location from at least two angles. The location of the aircraft is recorded for each photograph (step 164). In step 166, photogrammetry is used to determine thousands of three dimensional coordinates along the track surface and location near the edge of the track. In step 168, the edges of the track surface are extracted. In some cases, the edges of the track surface include an inner oval (or other shape) and an outer oval (or other shape). In step 170, the track surface is divided into a set of two or more sub-surfaces. In one embodiment, the sub-surfaces are polygons (or other shapes). In one implementation, step 170 includes dividing the track into triangles using Delauney triangulation. In step 172, the triangles are transformed from the geographic frame to the local frame as discussed above. In step 174, the triangles are transformed to the ECEF frame. In step 176, the system computes the covariance matrix $C_x$ and the weight matrix $P_x$ (described below) with respect to the ECEF frame for each triangle. In step 178, the entire track model space is divided into a grid. In one embodiment, the grid includes 256 equally sized rectangles in the local frame.

In one implementation, the process of FIG. 1 is performed prior to a race (or other event). After the process of FIG. 1 is completed, the track model is available to the GPS receiver for use in determining the position of the GPS antenna.

Figure 2:
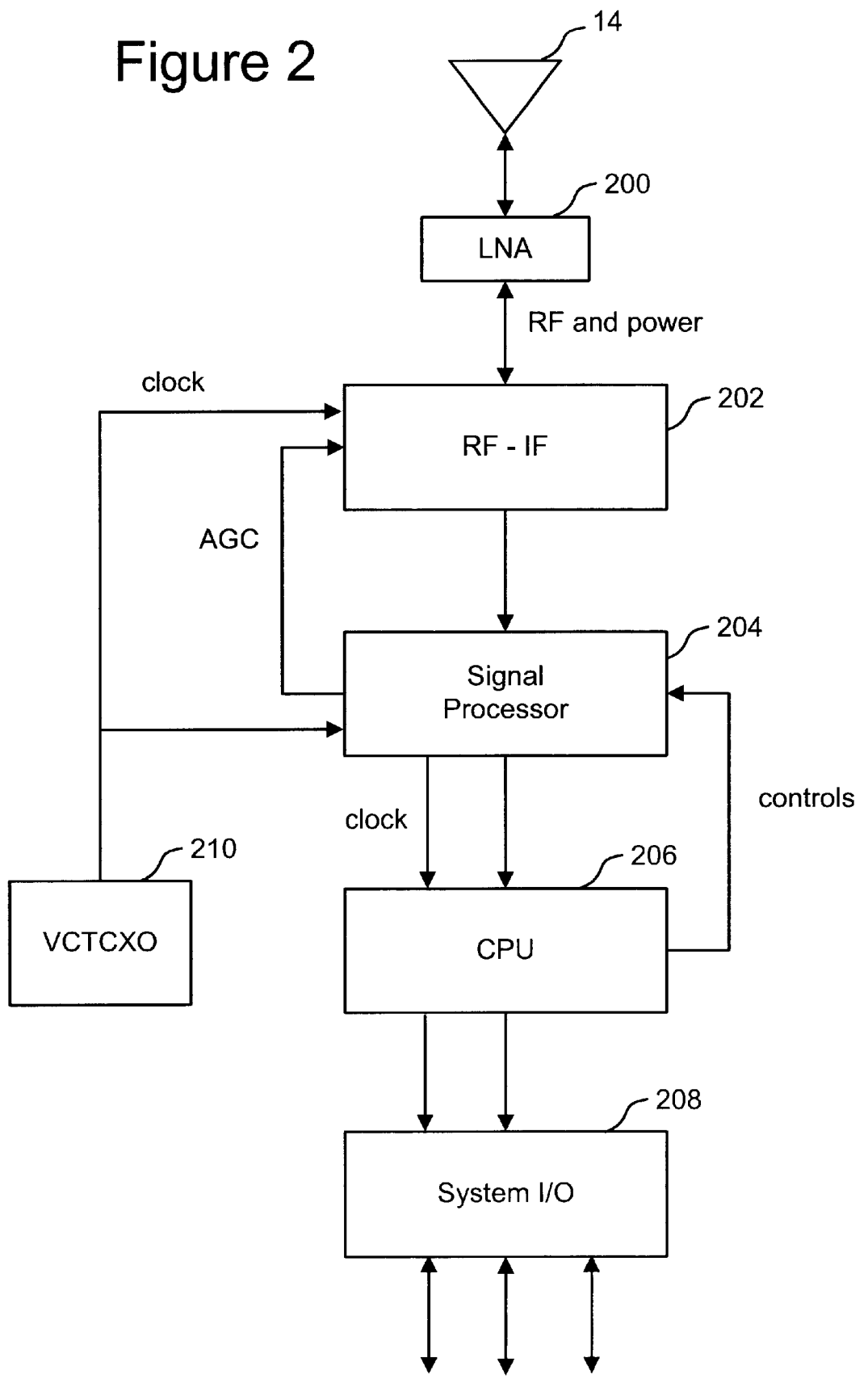
FIG. 2 is a block diagram of a GPS receiver.

FIG. 2 is a block diagram of the major components of one embodiment of a GPS receiver that can be used with the current invention. Other receiver configurations and designs can also be used with the current invention. FIG. 1 shows antenna 14 connected to low-noise amplifier ("LNA") 200. LNA 200 is connected to RF to IF translation unit 202, which translates the incoming RF signal to an IF signal usable by the digital section of the receiver. RF to IF translation unit 202 supplies power to LNA 200 and receives a clock signal from on-board 20 MHz voltage controlled, temperature compensated crystal oscillator (VCTCXO) 210. The digital section of the receiver receives a down-converted, amplified GPS signal which it digitizes and processes to obtain a GPS solution (position, velocity and time). The GPS signal is sent from RF to IF translation unit 202 to signal processor 204. In one embodiment, the analog to digital converter is part of signal processor 204 and receives the signal from RF to IF translation unit 202. In another embodiment, the analog to digital converter is a separate component between RF to IF translation unit 202 and signal processor 204. Signal processor 204 receives a clock signal from VCTCXO 210, provides a clock signal to CPU 206 and sends information back to RF to IF translation unit 202 (see signal AGC). Signal processor 204 receives control signals from CPU 206 and provides data to CPU 206. Information is transmitted between CPU 206 and system 110 208 for communication with components outside of the receiver. Differential GPS data is provided to the GPS receiver via system I/O 208. Not explicitly depicted in FIG. 2 are various supporting circuitry, memory (which may be part of the CPU), control and configuration logic, and serial peripheral devices, each of which can be separate components or part of one of the depicted components (including the processor). One example of a GPS receiver is the OEM4 from Novatel, Inc.

Figure 3:
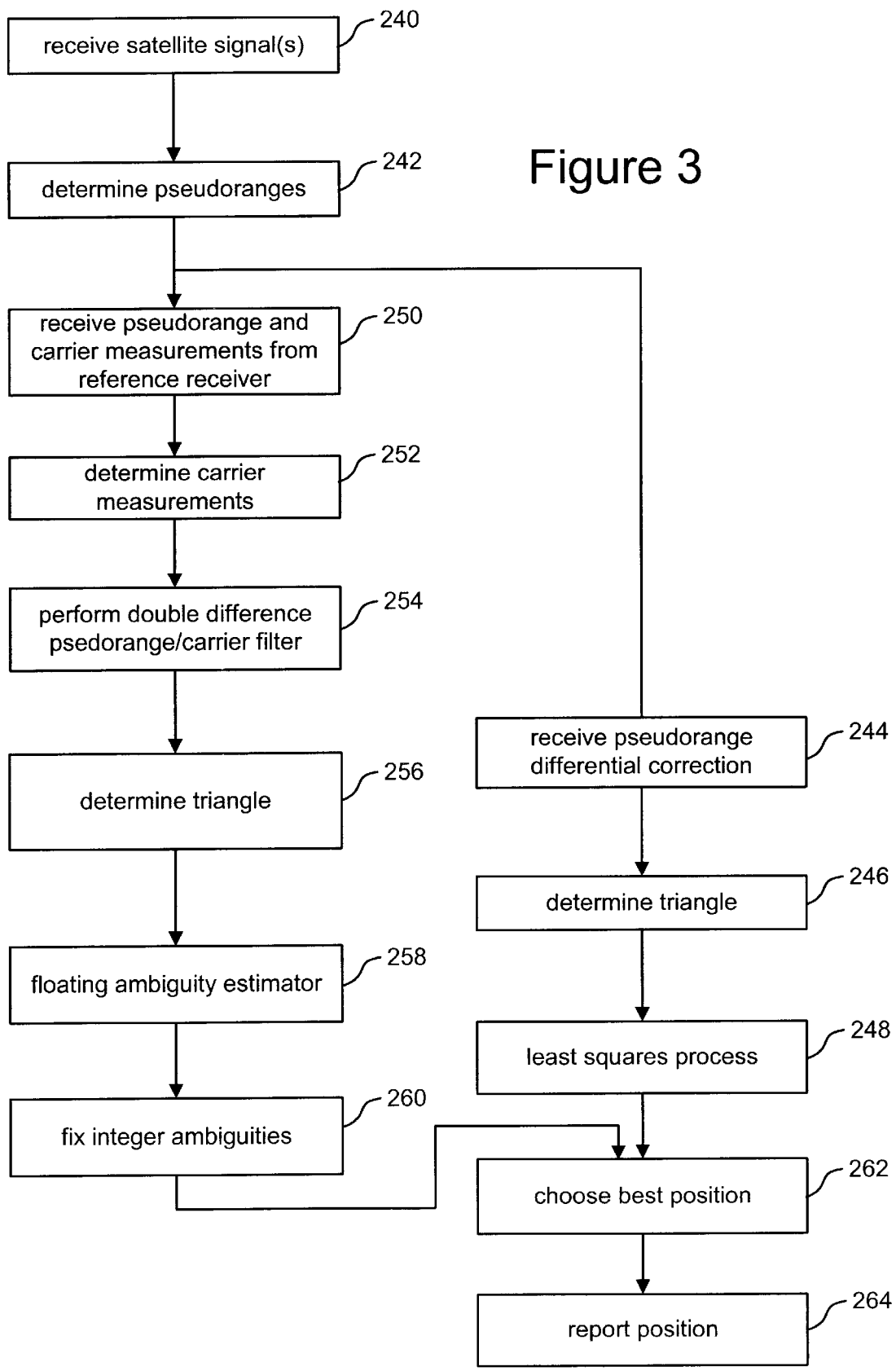
FIG. 3 is a flow chart describing a process performed by the GPS receiver.

FIG. 3 is a flow chart describing one embodiment of the operation of a GPS receiver according to the present invention. In step 240, one or more signals from a set of satellites are received. In step 242, psuedoranges are determined. FIG. 3 shows that after step 242, two independent processes are performed. The first process includes steps 244–248. The second process includes steps 250–260.

In step 244, differential corrections are received from the differential reference receiver. In step 246, the system accesses the track model and determines the appropriate planar surface to use for constraining the GPS determined position. In one embodiment, the track model is comprised of a set of triangles and step 246 includes determining which triangle represents the portion of the track that the receiver is currently on (or within). In one implementation, there are four relevant frames: (1) ECEF, (2) local frame, (3) geographic frame (e.g. WGS84), and (4) the planar surface (or triangle) frame. One embodiment of the track model is originally created and broken into triangles in the geographic frame. All of the vertices of the triangles are converted to the local frame and the ECEF frame prior to the race (or other event). The position supplied to the search mechanism of step 246 is converted from ECEF to the local plane in real-time and the search mechanism operates in the local frame. The result of the search mechanism is an identification of a triangle in the local plane, which is used to access the three vertices of the triangle already converted to the ECEF frame. In step 248, the GPS receiver performs a least squares process using the triangle identified in step 246.

In step 250, the system receives pseudoranges and carrier measurements from the reference receiver. In step 252, the system determines carrier measurements. In step 254, the system performs the double difference/carrier filter. In step 256, the system determines the appropriate triangle. In step 258 a floating ambiguity estimator is used, which provides a position covariance. In step 260, ambiguities are fixed using an integer ambiguity estimator. More detail about steps 252–260 are provided below.

In step 262, the system chooses the best position to report, based on the least squares process, the floating ambiguity estimator and the integer ambiguity estimator. In step 264, the position determined by the GPS receiver is reported. In one embodiment, reporting includes transmitting an electronic message to a client device so that the position, velocity and time can be stored, used, displayed, etc. In a different alternative, the receiver will initially report the position based on step 248, and after a predesignated amount of time or calculations the receiver will report the position based on steps 258 and 260.

Figure 4:
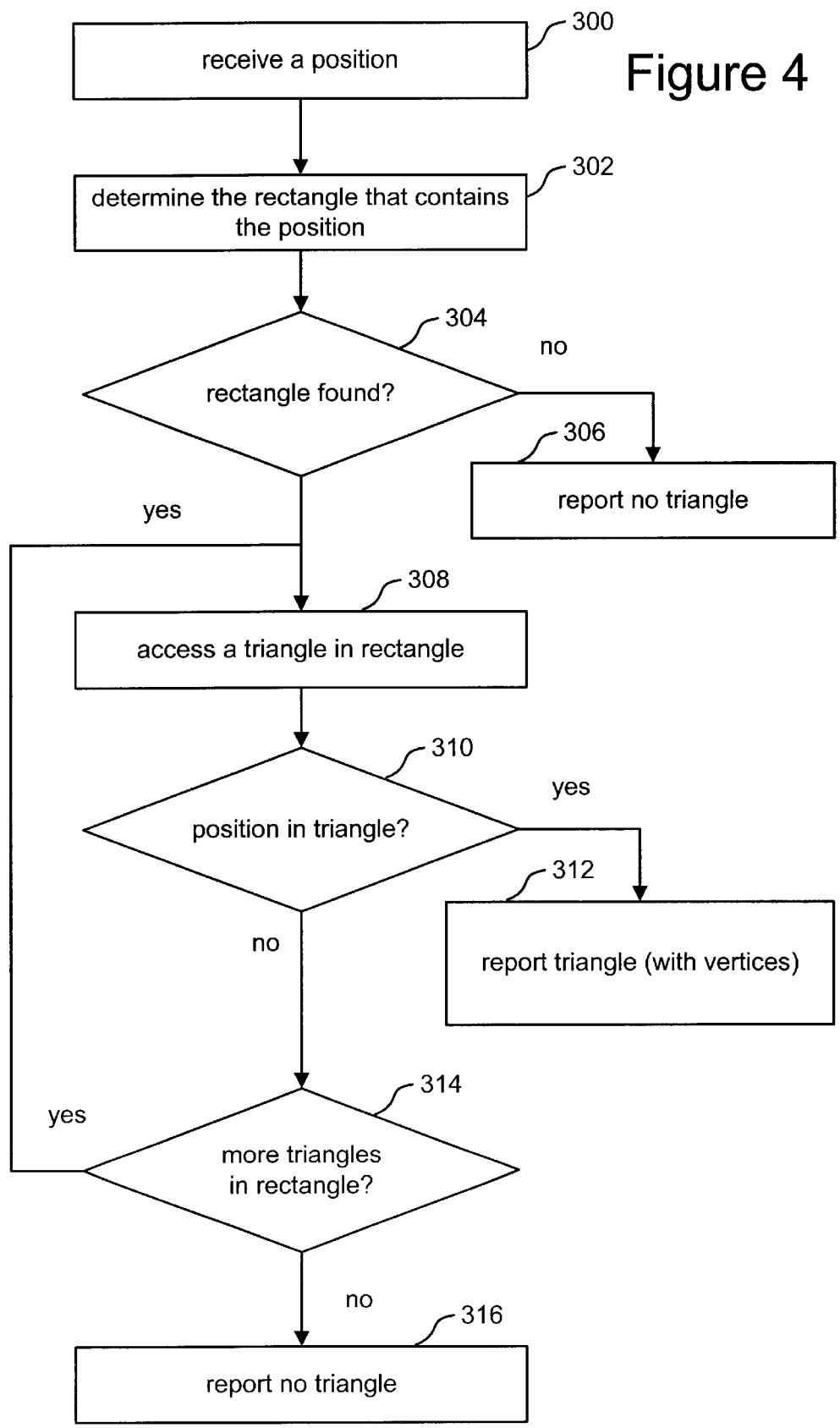
FIG. 4 is a flow chart describing a process for identifying an appropriate triangle from the track model.

FIG. 4 is a flow chart that describes the process of determining which triangle of the track model the receiver is currently navigating on. In step 300, the process receives a position of the receiver. In one embodiment, the position received in step 300 is the position generated by the GPS receiver at the last epoch. In another embodiment, the position received in step 300 is a current position determined by the GPS receiver without using the track model constraint.

In one implementation, the process of FIG. 4 is performed twice: once for the least squares process and once for the Kalman filter. When performing the process of FIG. 4 for the least squares process, step 300 includes receiving the position generated by the GPS receiver at the last epoch for the least squares process. When performing the process of FIG. 4 for the Kalman filter, step 300 includes receiving the current position determined by the GPS receiver without using the track model constraint for the Kalman filter.

In step 302, the receiver determines the rectangle in the track model space (see step 176) that contains the position received in the previous step. If no such rectangle is found (step 304), than the process reports in step 306 that the position is not within a triangle and the track model cannot be used to constrain the GPS position. If a rectangle is found (step 304), then the GPS receiver accesses one of the triangles within the rectangle in step 308 and determines whether the position (from step 300) is in (or on) the triangle in step 310. A triangle is in a rectangle (for purposes of step of 308) if any part of the triangle is within the rectangle. Thus, a triangle can be in many rectangles and a rectangle may contain many triangles. Step 310 can be performed by comparing the coordinates of the vertices of the triangle to the position from step 300. If the position is within the triangle (step 310), then the process of FIG. 4 identifies the triangle in step 312. If the position was not in the triangle (step 310), then the process determines whether there are more triangles in the rectangle that need to be considered (step 314). If there are more triangles to consider, then the method loops back to step 308. If there are no more triangles to consider, then the process reports in step 316 that the position is not within a triangle and the track model cannot be used to constrain the GPS position.

Step 248 includes using a least squares process with the identified triangle. The least squares process is described below. The modification required to constrain to a planar surface follows.

The least squares filter generates corrections to the system's ECEF position and clock according to the equation:

$$\delta X = (A^T P A)^{-1} A^T P \omega$$

where $\delta X$=correction vector to position vector and clock $[X, Y, Z, Clk]_T$ A=design matrix (nx4) based on satellite to receiver geometry In detail $A = [A_1, A_2, A_3 \ldots A_n]^T$ And $A_i = [\partial R^i/\partial X, \partial R^i/\partial Y, \partial R^i/\partial Z, 1]$ with $R^i = ((X^i - X)^2 + (Y^i - Y)^2 + (Z^i - Z)^2)^{1/2}$ X,Y,Z=ECEF user position $X^i, Y^i, Z^i$=ECEF satellite position P=Pseudo range observation weight matrix (nxn) which is diagonal, with the diagonal entries being the reciprocal of the variance entries of the pseudo ranges; and $\omega$= The vector of misclosures between the theoretical observations based on the current satellite set and the last set of positions estimated, and the actual observations (pseudo ranges). The values of X, Y, Z at the first iteration are the constrain position, $X_{cp}$. At later iterations, the position remains somewhat close to $X_{cp}$, with the vertical component of the position being especially close to the vertical component of $X_{cp}$ So:

$$\omega = R_{obs} - R^i - Clk$$
$$= R_{obs} - ((X^i - X)^2 + (Y^i - Y)^2 + (Z^i - Z)^2)^{1/2} - Clk$$

$R_{obs}$ is based on the measured pseudoranges. At every observation time, the process is repeated until the length of the vector of corrections ($\delta X$) to the position/clock parameter vector is small enough. In some cases, this may be accomplished after two iterations. At each epoch, the previous position and clock estimate is used to start the process, but any covariance information associated with that estimate is ignored. This means that at every epoch, at least 4 satellites are needed to estimate the 4 elements on the position/clock vector. If information related to the position/clock parameters were available, then this could be included in a modified least squares process according to the following:

$$\delta X = (A^T P A + P_x)^{-1} A^T P \omega$$

where $P_x$=Parameter weight matrix (4x4) based on knowledge of the parameters includes in the estimation process.

If certain elements of the parameter vector are well known, then this knowledge can be incorporated in the system by making the appropriate diagonal elements of the parameter weight $P_x$ large. If, for example, the clock estimate has a standard deviation of ½ m, then the $P_x$ entry $P_{4,4}$ would be 4, and one less satellite would be required in the estimation process to generate a 4 parameter solution.

There are more complications if the knowledge of height is to be represented by this system. Height is in the geographic reference frame; therefore, the covariance information for height must be transformed from the geographic frame to the ECEF frame before it can be used by the system in the estimation process. The $P_x$ matrix is:

$$P_x = C_x^{-1} = (J^T C_g J)^{-1}$$

where:

$C_g$=the covariance matrix of the position/clock in the geographic frame;

J=the matrix of derivatives of the transformation of position/clock from the geographic to the ECEF frame; and $C_x$=the covariance matrix of position/clock in the ECEF frame.

In the case of the track model application, J is not the rotation matrix used to transform a vector from the geographic to the ECEF frame, but instead a rotation matrix used to transform a vector from the planar section frame to the ECEF frame. The J matrix is used to set up the weight and covariance matrices of the constraint positions, and these matrices are pre-computed prior to the race. The J matrices are not required except for this, so in one embodiment they aren't retained for or recomputed during the race. The J matrix can be generated by representing three basis vectors, describing the planar section frame and a normal to it, in the ECEF frame. The positions of the vertices of each triangle are transformed from the geographic to the ECEF frame. The differences of these vectors are parallel to the planar section, and the cross product of two of these difference vectors provides a normal vector to the planar section. The cross product of the normal vector with either of the vector differences generates a vector parallel to the planar section and orthogonal to the other two vectors used in the cross product. Finally, normalizing these three vectors provides a set of orthonormal basis vectors representing the planar section frame in ECEF co-ordinates. So this set of vectors can be concatenated to generate J, the 3 by 3 rotation matrix used to rotate a vector from the planar section frame to the ECEF frame. Symbolically:

$$J = [B_1 | B_2 | B_3]$$

where $B_1, B_2, B_3$ are the basis vectors whose construction is defined in the previous paragraph.

The constraint position is given by the average of the three corner positions in the ECEF frame plus the constraint position relative to the planar section, transformed to the ECEF frame. Symbolically, this is:

Constraint position: $X_{cp} = ((X_1 + X_2 + X_3)/3.0) + J^* [0,0,h_a]^T$ where $X_1, X_2, X_3$ are the ECEF positions of the planar section corners, and $h_a$ is the antenna height with respect to a level planar section.

Looking back at FIG. 3, the process of steps 250–260 will be explained in more detail. The system uses a Kalman filter with the track model. This process is also known as the RT20 process. The RT20 process generates estimates of the relative position between a reference GPS receiver and a roving GPS receiver as well as estimates of floating ambiguities related to the double difference carrier observations for those two receivers. In one embodiment, the RT20 process provides a best available solution when real-time kinematic (RTK) data is not available as well as providing an initial search space for the RTK carrier based process.

Carrier positioning is a process in which a relative position between two ground sites (a base station and a roving receiver) is computed based upon observed fractional phase differences and known whole cycle differences between the two receivers. The fractional and whole cycle differences together produce a synthetic observation which is equal (when converted to meters) to the geometrical difference in distance between the two receivers and the satellite they are both observing. Knowledge of the whole cycle portion of the synthetic observation cannot normally be determined directly from the observations, but must be determined indirectly from many observations over time during what is known as a whole cycle resolution process. The whole cycle difference is also known as a carrier ambiguity, and the resolution process is known as an ambiguity resolution process.

In one process, in order to resolve fixed integer ambiguities, an initial guess of the position difference is made and a series of sets of ambiguity candidates is selected such that each set will generate a position difference that is close to the one chosen in the initial guess. Each set is used to compute a position difference and an associated set of residuals. For each set, these residuals are accumulated and the accumulation compared to a theoretical accumulation and also to other accumulations in the series of candidate sets. If the correct set of ambiguities is in the series, then eventually its residual accumulation will be close to the theoretical accumulation and also smaller than any of the residual accumulations for the other sets. At this time the correct ambiguity set is known and can be used to generate relative positions with carrier type accuracy.

To summarize, there are two things that are done to resolve ambiguities:

(1): Guess at an initial position, and an associated search space whose size is based on the precision of the initial position estimate; and (2): Use the guess and its precision to define a series of candidate sets of ambiguities and then accumulate computed residuals over time and eliminate sets whose residual accumulation exceeds some kind of threshold.

Typically a Kalman filter with both position and ambiguity states is used to define an initial guess for the search space. It is run in real-time as carrier and pseudo range observations are provided to it and some kind of executive routine monitors its position covariance to see when the search space can be defined and search can commence. By including position constraints with the GPS observation set, the precision of the initial position estimate used to define the search space can be reduced sooner and more, and this should significantly speed up the resolution process.

The Kalman filter used to estimate position and floating ambiguity states can be described as follows:

State: $X = [x, y, z, N1, N2, \ldots Nk]$

The variables x, y, and z represent position states. The variable N1, N2 . . . Nk represent ambiguity states.

State Initial Covariance: P=[big diagonal elements, 0 off diagonal elements]

The design matrix H defines the linear relationship between the double difference observation (satellites r,j and the two receivers) and the state elements. For satellite j and reference satellite r the phase relationship is:

$$H=[\Delta x^r_m/R^r_m-\Delta x^j_m/R^j_m, \Delta y^r_m/R^r_m-\Delta y^j_m/R^j_m, \Delta z^r_m/R^r_m-\Delta z^j_m/R^j_m, 0, 0, \ldots 1, 0, \ldots 0];$$

$\Delta x^r_m$ is the x component difference between reference satellite position and mean position of the base and rover receiver. $\Delta y^r_m$ is the y component difference between reference satellite position and mean position of the base and rover receiver. $\Delta z^r_m$ is the z component difference between reference satellite position and mean position of the base and rover receiver. $R^r_m$ is the geometrical distance between reference satellite position and mean position of the base and rover receiver. $\Delta x^j_m$ is the x component difference between jth satellite position and mean position of the base and rover receiver. $\Delta y^j_m$ is the y component difference between jth satellite position and mean position of the base and rover receiver. $\Delta z^j_m$ is the z component difference between jth satellite position and mean position of the base and rover receiver. $R^j_m$ is the geometrical distance between jth satellite position and mean position of the base and rover receiver.

The pseudorange relationship is:

$$H=[\Delta x^r_m/R^r_m-\Delta x^j_m/R^j_m, \Delta y^r_m/R^r_m-\Delta y^j_m/R^j_m, \Delta z^r_m/R^r_m-\Delta z^j_m/R^j_m, 0, 0, \ldots 0, \ldots 0]$$

The Kalman filter mechanization is as follows:

Gain: $K_k = P_k(-)H_k^T[H_k P_k(-)H_k^T + R_k]^{-1}$

Covariance Update: $P_k(+) = [I - K_k H_k]P_k(-)$

State Update: $X_k(+) = X_k(-) + K_k[Z_k - H_k X_k]$ where R=Observation covariance matrix (scalar for phase and pseudo range observations) and is the same as the $C_x$ matrix (below) for the position update; and z=Observation (pseudo range or carrier measurement)

The Kalman filter elements are:

Xk(−): State vector at time k before Kalman update;
Xk(+): State vector at time k after Kalman update;
Pk(−): State vector covariance matrix at time k before Kalman update;
Pk(+): State vector covariance matrix at time k after Kalman update;
Zk: Observation vector (from GPS or the track model);
Rk: Observation covariance matrix (or variance in the case of a single GPS observation); and
Hk: Design Matrix at time k.

In the pseudo range and phase measurement implementation, the observations are decorrelated and the updates are done serially, one for each observation. With the position constraint information from the track model, the observation/state relationship is:

$$H = \begin{vmatrix} 1, 0, 0, 0, \ldots, 0 \\ 0, 1, 0, 0, \ldots, 0 \\ 0, 0, 1, 0, \ldots, 0 \end{vmatrix}$$

H=[I0,] with I=3×3 and 0=3×(n−3), (n=number of states) and $C_x$ is the covariance matrix of the constraint position:

$$C_x = J^T C_t J$$

where $C_t$=The covariance matrix of the position in the "triangle" (or planar section) frame; and J=The rotation matrix used to rotate a vector from the triangle frame to the ECEF frame.

In one embodiment, the covariance matrix of the position in the triangle frame can be defined as:

$$C_t = \begin{vmatrix} 10000, & 0, & 0 \\ 0, & 10000, & 0 \\ 0, & 0, & 0.0001 \end{vmatrix}$$

that is, the parallel elements are more or less unknown, and the normal element is known to 10 cm at 1 sigma.

The results of the RT20 process is a vector which can be applied to the base station ECEF position (also transmitted to the local receiver with the differential observations) to give an ECEF position of the local receiver. The RT20 vector becomes more accurate as time goes on, so the local position accuracy also becomes more accurate.

The RT20 filter computes a vector between the base station and the local or rover receiver. In the absence of any track model the derived position will be Base Position plus RT20 vector. If the base station coordinates are in error relative to the relevant frame, then there will be a reported mismatch between the items in the true ECEF frame and the ECEF positions reported by the receiver. In order to account and remove this mismatch, the base station's transmitted position can be shifted by the amount of the mismatch and then the true and reported positions should be the same.

The mismatch is determined by a reconciliation process that is done prior to each race (or other event). In one embodiment, the data is reconciled by shifting the base station coordinates in the track model by an offset. The offset is determined by comparing the position of a stationary object in the track model with an accurately surveyed position for that object. In another embodiment, the reconciliation process is determined by comparing the track model normal constraint with the precise GPS position in the direction normal to the track model section applicable to the GPS position. This comparison is given by ω:

$$\omega = R_e^P{}_{(Row\ 3)}(Pos_{RT} - Pos_{TM})$$

where $R_e^P$=the rotation matrix used to transform a vector from the ECEF to "triangle" frame;
$Pos_{RT}$=the unconstrained GPS ECEF position and
$Pos_{Tm}$=the track model constraint position in the ECEF frame;

Note that ω is just the third element of the vector, because this is the part in the direction normal to that pertinent triangle.

The following estimation process can be used to determine the offsets required to reconcile the base station and track model reference frames. The offset between the base station frame and the track model frame is reflected in triangle frame coordinates as $x^t_3 = x^e \circ n_3$. The observation equation that models this vector component is:

$$\omega = x^e \circ n_3 = R_e^P{}_{(Row\ 3)}(Pos_{RT} - Pos_{TM})$$

or $$\omega = x^e \circ n_3 = U_3^T R_p^e (Pos_{RT} - Pos_{TM})$$

where:
$x^e$=Base station shift in the ECEF frame,
$x^t_3$=z component of base station shift in triangle frame
$n_3$=normal vector to the triangle in the ECEF frame,
$R_p^e$=the rotation matrix used to transform a vector in "triangle frame" coordinates to the ECEF frame;

$U_3$=unit vector normal to the triangle in the "triangle frame" $U_3=[0,0,1]^T$; and o=dot product operator.

Note that $n_3$ is simply the transpose of the last column of $R_p^e$. A least squares estimate can easily be generated from this ω via $$X=(\Sigma(A^TA))^{-1}\Sigma(A^t\omega)$$

where:

$$A_1=n_{3_1}=R_p{}^e{}_1U_3$$

The summation goes from i=1 to the number of RTK observations on the model. In order for this to work, a model with reasonable variation of normal vectors has to be used if all three components are to be observable.

The track model constraints improve the positioning accuracy significantly, up to a factor of 10 in many cases and sometimes more. In most cases, the improvement is in height, but in conditions of poor geometry the horizontal accuracy is also much better (sometimes more than 100 times better) in the constrained case. The horizontal accuracy also improves depending on the slope of the constraining section with respect to the local level because if there is a significant slope, then a component of the planar section's normal vector will be parallel to the local level plane.

In some embodiments, the track model is extended (extrapolated) outside the ribbon of the track so that bad geometry cases also have the use of a planar constraint.

In some embodiments, the track model constraints only work in the cases where there are at least four satellites In other embodiments, the track model can be used when providing a degraded solution by accepting fewer observations as the required minimum number in either the least squares process or the RT20/Kalman filter.

Although portions of this discussion refer to an embodiment for use at an auto race, the present invention is not limited to use with an auto race and can be used in many different environments. Thus, the track model can be used to model surfaces other than a race track.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for constraining GPS derived position information for an object, comprising:

accessing a model of one or more navigation surfaces, said model includes a set of two or more sloped planar surfaces, said sloped planar surfaces approximate said one or more navigation surfaces;

identifying a first sloped planar surface of said set of sloped planar surfaces as being in proximity to said object; and using said model to constrain a GPS based determination of a position of said object to said first sloped planar surface.

2. A method according to claim 1, wherein:

said sloped planar surfaces are polygons.

3. A method according to claim 1, wherein:

said model is divided into a grid of rectangles; and said step of identifying a first sloped planar surface includes using an initial position to identify a first rectangle from said grid of rectangles and considering only surfaces in said first rectangle in order to identify said first sloped planar surface.

4. A method according to claim 1, wherein:

said model is created based on a geographic frame;

said GPS based determination is performed in an ECEF frame; and said model is transformed to an intermediate frame.

5. A method according to claim 1, wherein:

said step of using includes performing a single epoch least squares process.

6. A method according to claim 5, wherein:

said step of using includes constraining said least squares process based on said model.

7. A method according to claim 6, wherein:

said step of using includes using a Kalman filter to generate one or more estimates of a relative position between a reference receiver and said object.

8. A method according to claim 7, wherein:

said step of using includes constraining said Kalman filter based on said model.

9. A method according to claim 1, wherein:

said model is created based on a geographic frame;

said GPS based determination is performed in an ECEF frame;

said model is transformed to an intermediate frame;

said sloped planar surfaces are triangles;

said step of constraining assumes that an antenna mounted to said object has a constant position in a direction normal to said one of said triangles; and said step of using includes performing a single epoch least squares process that is constrained by said one of said triangles.

10. A method according to claim 1, further comprising the steps of:

receiving satellite signals;

determining pseudoranges based on said satellite signals;

calculating an initial position using said pseudoranges, said initial position used by said step of using said model to constrain a GPS based determination; and reporting said position.

11. A method according to claim 1, further comprising the step of:

creating said model, said step of creating said model includes the steps of:

surveying locations on or near said one or more navigation surfaces;

capturing aerial photographs of said one or more navigation surfaces using a sensor;

recording locations of said sensor while capturing said aerial photographs; and determining three dimensional coordinates on said one or more navigation surfaces based on said captured aerial photographs, said surveying and said recorded locations.

12. A method according to claim 11, wherein said step of creating said model comprises the step of:
   dividing said model into a plurality of polygons.
13. A method according to claim 11, wherein said step of creating said model further comprises the steps of:
   extracting edges of said one or more surfaces; and
   using said edges to divide said model into a plurality of polygons.
14. A method according to claim 1, wherein:
   said step of using said model makes use of a constraint position that changes at almost every positioning epoch.
15. A method according to claim 1, wherein:
   said step of using said model makes use of a covariance matrix that changes at almost every positioning epoch.
16. A method according to claim 1, wherein:
   said step of using includes constraining a Kalman filter based on said model.
17. A method according to claim 1, wherein:
   said step of using said model includes constraining said position in a direction normal to said first sloped planar surface.
18. A method according to claim 1, wherein:
   said one or more sloped planar surfaces are triangles.
19. A method according to claim 1, wherein:
   said one or more sloped planar surfaces are triangles;
   said first sloped planar surface is a first triangle; and
   said step of using includes constraining said position to said first triangle using a least squares process.
20. One or more processor readable storage devices for storing processor readable code, said processor readable code for programming one or more processors to perform a method for constraining GPS derived position information for an object, the method comprising:
   accessing a model of one or more navigation surfaces, said model includes a set of two or more sloped planar surfaces, said sloped planar surfaces approximate said one or more navigation surfaces;
   identifying a first sloped planar surface of said set of sloped planar surfaces as being in proximity to said object; and
   using said model to constrain a GPS based determination of a position of said object to said first sloped planar surface.
21. One or more processor readable storage devices according to claim 20, wherein:
   said model is created based on a geographic frame;
   said GPS based determination is performed in an ECEF frame; and
   model is transformed to an intermediate frame.
22. One or more processor readable storage devices according to claim 21, wherein:
   said planar surfaces are triangles.
23. One or more processor readable storage devices according to claim 22, wherein:
   said model is divided into a grid of rectangles; and
   said step of identifying a first sloped planar surface includes using an initial position to identify a first rectangle from said grid of rectangles and considering only surfaces in said first rectangle in order to identify said first sloped planar surface.
24. One or more processor readable storage devices according to claim 20, wherein:
   said step of using includes constraining a least squares process based on said model.
25. One or more processor readable storage devices according to claim 20, wherein:
   said step of using includes constraining a Kalman filter based on said model.
26. One or more processor readable storage devices according to claim 20, wherein:
   said model is created based on a geographic frame;
   said GPS based determination is performed in an ECEF frame;
   said model is transformed to an intermediate frame;
   said planar surfaces are triangles;
   said step of constraining assumes that an antenna mounted to said object has a constant position in a direction normal to said one of said triangles; and
   said step of using includes performing a Kalman filter that is constrained by said one of said triangles.
27. One or more processor readable storage devices according to claim 20, wherein:
   said step of using said model makes use of a constraint position that changes at almost every positioning epoch.
28. One or more processor readable storage devices according to claim 20, wherein:
   said step of using said model makes use of a covariance matrix that changes at almost every positioning epoch.
29. One or more processor readable storage devices according to claim 20, wherein:
   said step of using said model includes constraining said position in a direction normal to said first sloped planar surface.
30. One or more processor readable storage devices according to claim 20, wherein:
   said one or more sloped planar surfaces are triangles;
   said first sloped planar surface is a first triangle; and
   said step of using includes constraining said position to said first triangle using a least squares process.
31. An apparatus capable of constraining GPS derived position information for an object, comprising:
   one or more inputs, said one or more inputs receive GPS data; and
   one or more processing units, said one or more processing units access a model of one or more navigation surfaces, said model includes two or more sloped planar surfaces, said sloped planar surfaces approximate said one or more navigation surfaces, said one or more processing units identify a first sloped planar surface of said set of sloped planar surfaces as being in proximity to said object and constrain a GPS based determination of a position of said object to said first sloped planar surface.
32. An apparatus according to claim 31, wherein:
   said one or more processing units include an analog-to-digital converter, a signal processor, memory, a central processing unit, control and configuration logic, and an I/O interface.
33. An apparatus according to claim 31, wherein:
   said one or more inputs include an antenna and a data input, said data input is capable of receiving differential GPS data; and
   said one or more processors utilize said differential GPS data to determine a said GPS based determination of said position of said object.

34. An apparatus according to claim 31, wherein:

said model is created based on a geographic frame;

said GPS based determination is performed in an ECEF frame; and said model is transformed to an intermediate frame.

35. An apparatus according to claim 31 wherein:

said planar surfaces are triangles.

36. An apparatus according to claim 35, wherein:

said model is divided into a grid of rectangles; and said one or more processors identify said first sloped planar surfaces by using an initial position to identify a first rectangle from said grid of rectangles and consider only triangles in said first rectangle.

37. An apparatus according to claim 36, wherein:

said one or more processor constrain a least squares process based on said model.

38. An apparatus according to claim 36, wherein:

said one or more processor constrain a Kalman filter based on said model.

39. An apparatus according to claim 31, wherein:

said one or more processing units use said model with a constraint position that changes at almost every positioning epoch.

40. An apparatus according to claim 31, wherein:

said one or more processing units use said model with a covariance matrix that changes at almost every positioning epoch.

41. An apparatus according to claim 31, wherein:

said one or more processing units constrain said position in a direction normal to said first sloped planar surface.

42. An apparatus capable of constraining GPS derived position information for an object, comprising:

one or more inputs, said one or more inputs receive GPS data; and one or more processing units, said one or more processing units access a model of one or more navigation surfaces, said model includes two or more sloped planar surfaces, said planar surfaces are triangles, said one or more processors identify one of said triangles as being in proximity to said object, said one or more processing units use said model to constrain a GPS determined position of said object including constraining a least squares process based on said one of said triangles, said object travels on said one or more navigation surfaces.

* * * * *

UNITED STATES PATENT AND TRADEMARK OFFICE
CERTIFICATE OF CORRECTION

PATENT NO. : 6,728,637 B2
DATED : April 27, 2004
INVENTOR(S) : Ford et al.

It is certified that error appears in the above-identified patent and that said Letters Patent is hereby corrected as shown below:

Column 15,
Line 55, before "model" insert -- said --.

Column 16,
Line 66, after "determine" and before "said" delete "a".

Signed and Sealed this

Twenty-sixth Day of October, 2004

JON W. DUDAS
*Director of the United States Patent and Trademark Office*